United States Patent [19]

Kubo

[11] Patent Number: 4,893,607
[45] Date of Patent: Jan. 16, 1990

[54] WIRE DRIVE APPARATUS FOR WIRE SAW

[75] Inventor: Setsuo Kubo, Kyoto, Japan

[73] Assignee: Kabushiki Kaisha Dymosha, Japan

[21] Appl. No.: 222,547

[22] Filed: Jul. 21, 1988

[30] Foreign Application Priority Data

Jul. 31, 1987 [JP] Japan .............................. 62-118367[U]

[51] Int. Cl.$^4$ ............................................. B28D 1/08
[52] U.S. Cl. .................... 125/21; 51/135 R
[58] Field of Search ........... 125/21; 51/135 R, 135 B;
83/651.1, 666, 814, 816; 105/215.2; 299/35, 63

[56] References Cited

U.S. PATENT DOCUMENTS 4,633,848 1/1987 Bresciani ............................... 125/21
4,708,066 11/1987 Heckman ........................... 105/215.2

Primary Examiner—Frederick R. Schmidt
Assistant Examiner—M. Rachuba
Attorney, Agent, or Firm—Fidelman & Wolffe

[57] ABSTRACT

A wire drive apparatus for the wire saw which is favorably used, particularly for cutting the structures of reinforced concrete with the wire saw and movable on the base surface such as the surface of the road or floor without using cranes is disclosed. This wire drive apparatus is characterized by that in addition to the wire drive apparatus for the wire saw which consists of a carriage, a wire drive pulley for endless circulation of the cutting wire and a pulley drive means for turning the wire drive pulley that are installed on the carriage, rails laid on the surface of the road or floor, front wheels and rear wheels that hold the carriage so as to allow it traveling on the rails and a wheel drive means for turning the front wheels and the rear wheels, it is constructed by providing supplementary front wheels and supplementary rear wheels that hold the carriage so as to be movable on the base surface and that they have the points of contact with the base surface at a lower level than those of the front wheels and the rear wheels, at least one pair of them are provided with a steering means and when the front wheels and the rear wheels are engaged with the rails, the supplementary front wheels and the supplementary rear wheels float above the base surface or when the supplementary front wheels and the supplementary rear wheels touch the base surface, the front wheels and the rear wheels are made to float above the base surface.

12 Claims, 3 Drawing Sheets

WIRE DRIVE APPARATUS FOR WIRE SAW

BACKGROUND OF THE INVENTION

The present invention relates to a wire drive apparatus for a wire saw, that is used for circulating the cutting wire endlessly at a running speed and with a tension as required when the structures etc. made of reinforced concrete are cut with a wire-saw.

As a wire drive apparatus, the inventor recently developed a device which consists of a carriage, a wire drive pulley for endless circulation of the cutting wire and a pulley drive means for turning the wire drive pulley that are installed on the carriage, rails laid on the surface of the road or floor, the front and rear wheels that hold the carriage so as to allow it traveling on the rails and the wheel drive means for turning the front and rear wheels. The wire drive apparatus, while it endlessly rotates the cutting wire that is wound round the object of cutting by way of the wire drive pulley at a required speed, moves the carriage along the rails by way of the front and rear wheels away from the object of cutting and always keeps a required tension in the cutting wire, thus the object of cutting is gradually cut out.

Since the conventional wire drive apparatus, though it possesses front and rear wheels rolling on the rails as described above, lacks the means to move around on the surface of road, floor and so forth (It is called the base surface generally in this specification.), where rails are not laid, when the wire drive apparatus that weighs 1–1.5 ton or sometimes heavier than that is moved on the base surface in the field of work, for instance, in case the apparatus that lies on the base surface is placed on the rails or vice versa, a crane is indispensable. In such a case that large blocks of stone are cut out in a stone pit, there is generally a large space in the stone pit and cranes are invariably provided with for transportation of blocks of stone that have been cut out. Therefore, for the above-mentioned transfer of the wire drive apparatus on the base surface these cranes are readily available.

However, in such a case that the structures of reinforced concrete of the buildings, bridges, foundations, walls of subway tunnels etc. are cut out by the wire saw and partly dismantled, cranes are not always freely used, because the working space is generally small and complicated and sometimes the wire drive apparatus is placed on the floor indoors. Furthermore, unlike the case of the simple cutting out of large blocks of stone at the stone pit, the cutting operation of the reinforced concrete structures in most cases consists of a combination of plural partial cuttings whose locations and directions are different and the place of installation of the wire drive apparatus should be changed very often. Therefore, even if cranes can be freely used, transfer of the wire drive apparatus by the crane every time would lead to a drop in the work efficiency.

The present invention has for its object to offer a wire drive apparatus for the wire saw that is easily movable on the base surface.

SUMMARY OF THE INVENTION

The wire drive apparatus for the wire saw according to the present invention is characterized by that in addition to a wire drive apparatus for the wire saw which consists of a carriage, a wire drive pulley for endlessly circulating the cutting wire and a pulley drive means for turning the wire drive pulley that are installed on the carriage, rails laid on the base surface, front wheels and rear wheels that hold the carriage so as to allow it traveling on the rails and a wheel drive means for turning the front wheels and the rear wheels, it is constructed by providing supplementary front wheels and supplimentary rear wheels that hold the carriage so as to be movable on the base surface and that they have the points of contact with the base surface at a lower level than those of the front wheels and the rear wheels, at least one pair of them are provided with a steering means and when the front wheels and the rear wheels are engaged with the rails, the supplementary front wheels and the supplementary rear wheels float above the base surface of when the supplementary front wheels and the supplementary rear wheels touch the base surface, the front wheels and the rear wheels are made to float above the base surface.

This wire drive apparatus can be moved by way of the front wheels and the rear wheels on the rails and by way of the supplementary front wheels and the supplementary rear wheels on the base surface respectively. The supplementary front wheels and the supplementary rear wheels are driven to turn by manual power or any other suitable power source and at least one pair of them are able to change their direction, for instance, by way of the casters that automatically follow the direction of advance or by way of any steering means comprising a steering wheel mechanism that positively turn them toward the required direction.

Therefore, this wire drive apparatus can be easily transferred to any required position on the base surface without using cranes, especially when the wire drive apparatus that rests on the base surface is lifted on the rails or reversely the apparatus on the rail is lowered to the base surface, it can be done most handily.

DETAILED DESCRIPTION OF THE PREFERRED EMBODIMENTS

Figure 1:
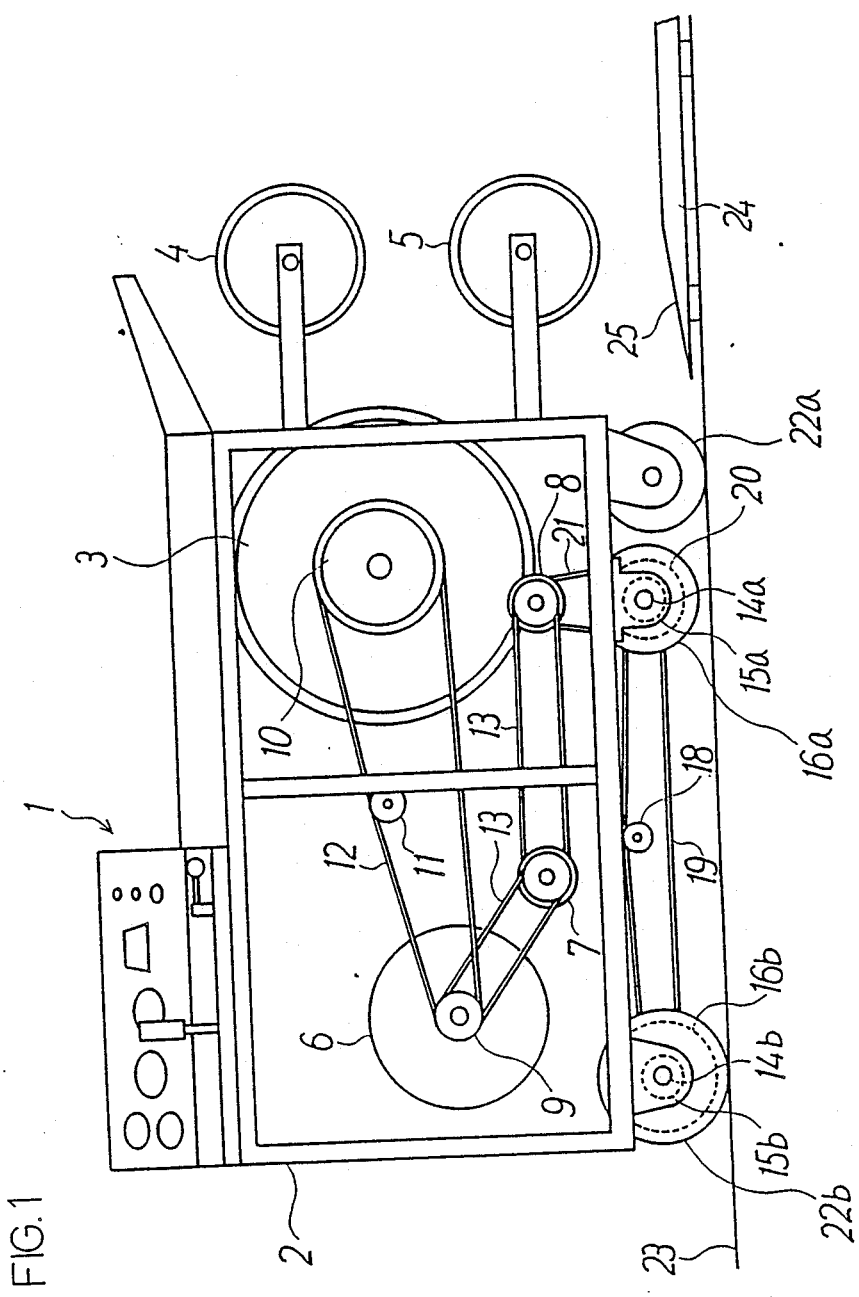
FIG. 1 is the interior front elevation of the wire drive apparatus for wire saw in accordance with the present invention placed on the base surface.
Figure 2A:
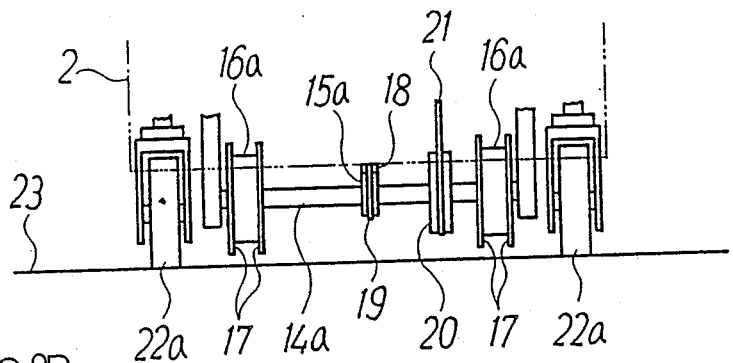
FIGS. 2A and 2B are the front elevation at the bottom of the wire drive apparatus shown in FIG. 1 when placed on the base surface and the same when placed on the rails respectively.
Figure 2B:
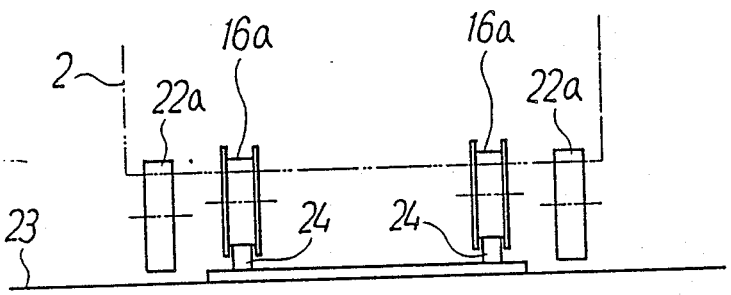
Figure 3:
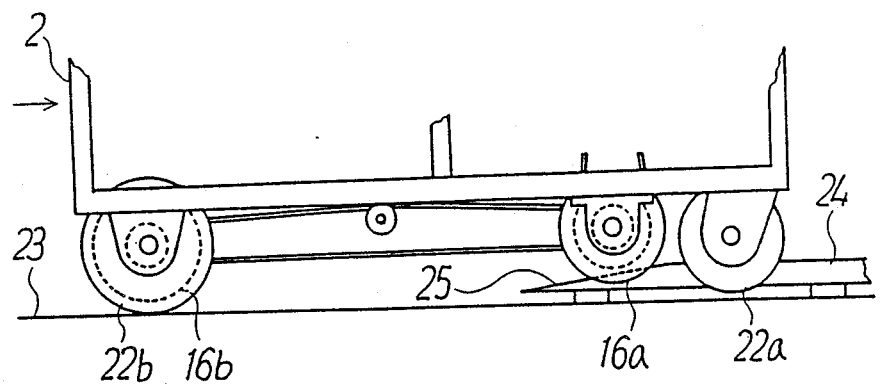
FIG. 3 is the elevation at the bottom that describes the conditions of the wire drive apparatus shown in FIG. 1 being transferred from the base surface up to the rails.

Referring to FIG. 1, FIG. 2A and FIG. 2B, a wire drive pulley 3 is installed on the carriage 2 in the wire drive apparatus 1 so as to rotate freely and in front of it and in the same plane a tensile side adjust pulley 4 and a loose side adjust pulley 5 are installed so as to rotate freely, furthermore a prime mover 6, a hydraulic stepless speed change device 7 and an electromagnetic two step reduction gear 8 are installed.

A transmission belt 12 is spanned by way of the tension pulley 11 over the driving pulley 9 of the prime mover 6 and the driven pulley 10 that rotates following the rotation of the wire drive pulley 3 and all the components mentioned in the above beginning with the prime mover 6 and ending at the driven pulley 10 constitute the means of driving pulleys.

Also, a transmission belt 13 is spanned over the driving pulley 9 and the input end of the stepless speed change device 7 and over the output end of the stepless speed change device 7 and the input end of the reduction gear 8 respectively. Furthermore, at the front and rear part of the bottom of the carriage 2, axles 14a and 14b are installed so as to rotate freely, and at the middle part of these axles 14a and 14b, chain wheels 15a and 15b and at the both ends of each axle 14a and 14b, the front wheels 16a and the rear wheels 16b are fitted respectively. These front wheels 16a and rear wheels 16b are fitted with the flanges 17 for prevention of derailing. Over the front and rear chain wheels 15a and 15b, a transmission chain 19 is spanned by way of a tension gear 18. Also, to the front axle 14a, the output end of a torque limiter 20 is coupled and a transmission chain 21 is spanned over the input end of the torque limiter 20 and the output end of the reduction gear 8. Thus, these components as mentioned in the above beginning with the prime mover 6 ending at the axles 14a and 14b co-operate and constitute the wheel driving means.

At the front and rear of the bottom part of the carriage 2, further outside the front wheels 16a and the rear wheels 16b, supplementary front wheels 22a and supplementary rear wheels 22b that have the points of contact with the ground at a lower level than those of the front wheels 16a and the rear wheels 16b are fitted so as to rotate freely. The front supplementary wheels 22a are provided with the means of steering comprising the caster mechanism and the rear supplementary wheels 22b are so installed as to share the common center line with the axle 14b.

If the carriage 2 is placed on the base surface 23 as shown in FIG. 1 and FIG. 2A, only the supplementary front wheels 22a and the supplementary rear wheels 22b contact with the base surface 23, leaving the front wheels 16a and the rear wheels 16b in the condition of floating. Thus, the carriage 2 can be easily moved on the base surface 23 by the action of pushing or pulling with manual power. By the way, the supplementary front wheels 22a or the supplementary rear wheels 22b may be positively rotated by such means of driving as prime movers (not illustrated).

On the base surface 23, rails 24 that can be engaged with the front wheels 16a and the rear wheels 16b and at least at one end of them, slopes 25 which are useful for smoothly guiding the front wheel 16a and the rear wheel 16b up to the rails 24 or disengage them smoothly out of the rails 24.

When the carriage 2 is placed on the rails as shown in FIG. 2B, the front wheels 16a and the rear wheels 16b (The rear wheels 16b are not illustrated.) are engaged with the rails 24 by way of the flanges 17 so as to roll on them and the supplementary front wheels 22a and the supplementary rear wheels 22b (The supplementary wheels 22b are not illustrated.) present the condition of floating above the bass surface 23.

When the wire drive apparatus 1 that lies on the base surface 23 is transferred up to the rails 24, the wire drive apparatus 1 is moved toward the sloped portion 25 of the rails on the base surface 23 by way of the supplementary front wheels 22a and the supplementary rear wheels 22b and first the front wheels 16a are brought to the condition of being engaged with the sloped portion 25 of the rails 24 and the front wheels 16a and the rear wheels 16b are driven to turn by way of the wheel turning means, then at the condition that the supplementary rear wheels 22b touch the base surface 23 and the supplementary front wheels 22a are floating above the base surface, the front wheels 16a climb along the sloped portion 25 of the rails 24 and move further along the rails 24. Following it, the rear wheels 16b are engaged with the rails 24 likewise and the supplementary rear wheels 22b reach the floating state above the base surface 23. By the way, it is also possible to shift the wire drive apparatus 1 from the end of the rear wheels 16b up to the rails 24. When the wire drive apparatus 1 is lowered from the base surface 23, it is done simply by driving the front wheels 16a and the rear wheels 16b to turn toward the reverse direction to the above on the rails 24.

Figure 4:
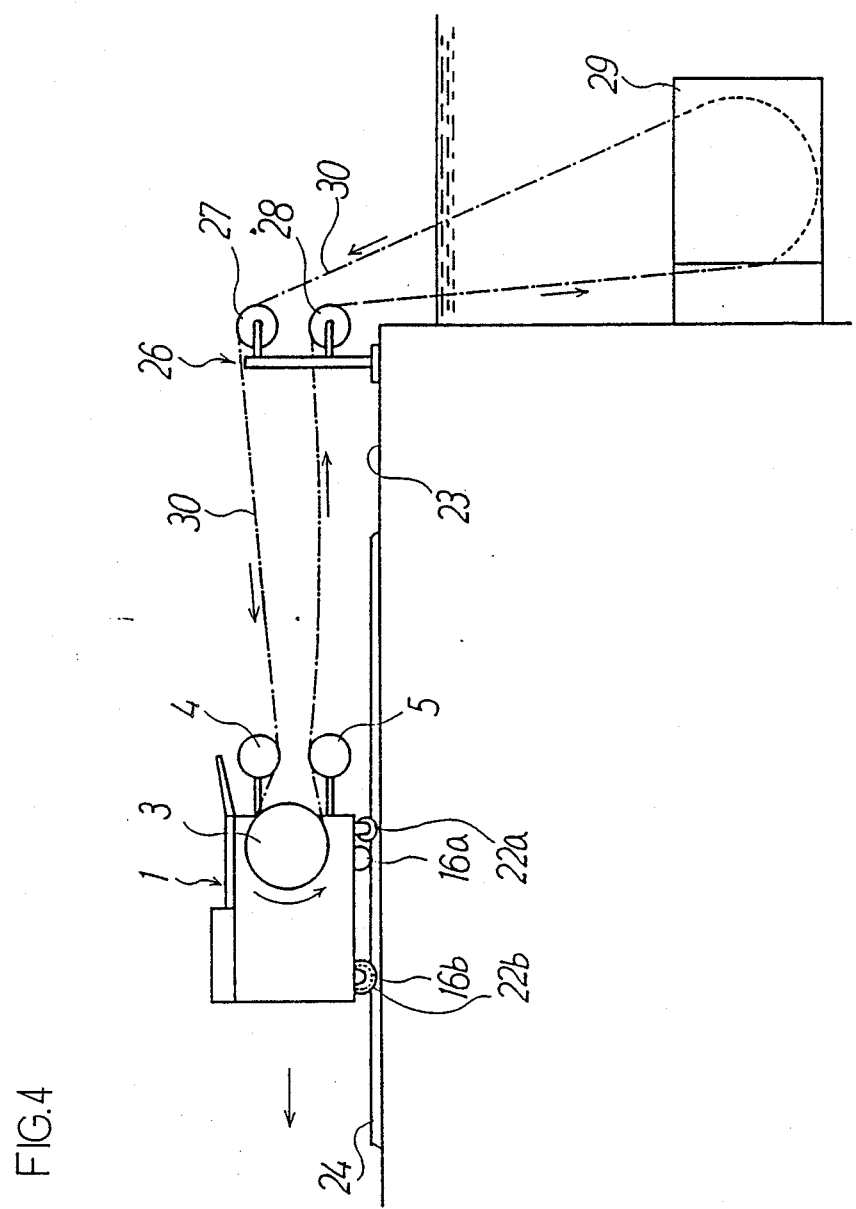
FIG. 4 is the outline elevation that illustrates the conditions of the wire drive apparatus shown in FIG. 1 being in use as one of the examples.

In operating the wire saw, the wire drive apparatus 1 is installed on the rails 24 as shown in FIG. 4, so that the front wheels 16a and the rear wheels 16b engage with the rails 24 and at the end of the base surface 23, the guide pulley stand 26 which is fitted with the upper and lower guide pulleys 27 and 28 is fixed with anchor bolts. In the water below the end of the base surface 23, there is a horizontal girder made of reinforced concrete 29 projecting toward the reader. The cutting wire is spanned over the wire drive pulley 3 and the horizontal girder 29 in an endless manner througth the guide pulleys 27 and 28 on the way and further through the tensile side adjust pulley 4 and the loose side adjust pulley 5.

In such a structure as described in the above, when the prime mover 6 is rotated. The rotation turns the wire drive pulley 3 successively by way of the driving pulley 9 and the driven pulley 10, and the cutting wire 30 circulates endlessly at a running speed as required. Simultaneously with it, as the said rotation of the prime mover 6 turns the front wheels 16a and the rear wheels 16b successively by way of the driving pulley 9, the stepless speed change device 7, the reduction gear 8, the torque limiter 20 and so forth, and shifts the wire drive apparatus 1 toward the direction away from the horizontal girder 29 along the rails 24, the tension in the circulating wire is kept at a constant value as required. In other words, in operating the wire saw, the wire drive apparatus 1 pulls the cutting wire 30 with a tension as required while circulating it at a running speed as required and the horizontal girder 29 in the water is gradually cut out.

The torque limiter is to limit the driving force, namely the turning torque of the axles 14a and 14b, within arange set in advance so that the tensile load in the cutting wire 30 circulating as described in the above would not become excessive, whereby break down of the cutting wire 30 or drop of the output of the wire drive apparatus 1 can be prevented.

As many apparently widely different embodiments of this invention may be made without departing from the spirit and scope thereof, it is to be understood that the invention is not limited to the specific embodiments thereof except as defined in the appended claims.

What I claim is:
1. A wire drive apparatus comprising:
   a carriage;
   a plurality of supplemental wheels rotatably mounted to said carriage for movably supporting said carriage on a base surface;

a plurality of rail wheels rotatably mounted to said carriage for movably supporting said carriage on a plurality of rails mounted on the base surface;

pulley means for circulating an endless cutting wire; and drive means for driving said pulley means and at least one of said rail wheels.

2. A wire drive apparatus as claimed in claim 1, wherein said plurality of rail wheels are in a floating condition relative to the base surface when said plurality of supplemental wheels are in contact with the base surface.

3. A wire drive apparatus as claimed in claim 1, wherein said plurality of supplementary wheels are in a floating condition relative to the base surface when said plurality of rail wheels are in contact with the plurality of rails.

4. A wire drive apparatus as claimed in claim 1, wherein said plurality of rail wheels are in a floating condition relative to the base surface when said plurality of supplemental wheels are in contact with the base surface, and wherein said plurality of supplementary wheels are in a floating condition relative to the base surface when said plurality of rail wheels are in contact with the plurality of rails.

5. A wire drive apparatus comprising:

a carriage;

a plurality of supplemental wheels rotatably mounted to said carriage for movably supporting said carriage on a base surface;

a plurality of rail wheels rotatably mounted to said carriage for movably supporting said carriage on a plurality of rails mounted on the base surface;

pulley means for circulating an endless cutting wire;

means for limiting torque; and drive means for driving said pulley means and for driving at least one of said rail wheels via said means for limiting torque.

6. A wire drive apparatus as claimed in claim 5, wherein said plurality of rail wheels are in a floating condition relative to the base surface when said plurality of supplemental wheels are in contact with said base surface.

7. A wire drive apparatus as claimed in claim 5, wherein said plurality of supplementary wheels are in a floating condition relative to the base surface when said plurality of rail wheels are in contact with the plurality of rails.

8. A wire drive apparatus as claimed in claim 5, wherein said plurality of rail wheels are in a floating condition relative to the base surface when said plurality of supplemental wheels are in contact with the base surface, and wherein said plurality of supplementary wheels are in a floating condition relative to the base surface when said plurality of rail wheels are in contact with the plurality of rails.

9. A wire driven apparatus comprising:

a carriage;

a plurality of rails mounted on a base surface;

a plurality of supplemental wheels rotatably mounted to said carriage for movably supporting said carriage on the base surface;

a plurality of rail wheels rotatably mounted to said carriage for movably supporting said carriage on said plurality of rails;

pulley means for circulating an endless cutting wire; and drive means for driving said pulley means and at least one of said rail wheels;

wherein said plurality of rails have a sloped portion on at least one end thereof for engaging said plurality of rail wheels.

10. A wire drive apparatus as claimed in claim 9, wherein said plurality of rail wheels are in a floating condition relative to the base surface when said plurality of supplemental wheels are in contact with said base surface.

11. A wire drive apparatus as claimed in claim 9, wherein said plurality of supplementary wheels are in a floating condition relative to the base surface when said plurality of rail wheels are in contact with said plurality of rails.

12. A wire drive apparatus as claimed in claim 9, wherein said plurality of rail wheels are in a floating condition relative to the base surface when said plurality of supplemental wheels are in contact with the base surface, and wherein said plurality of supplementary wheels are in a floating condition relative to the base surface when said plurality of rail wheels are in contact with said plurality of rails.

* * * * *